US009788537B1

(12) United States Patent
Goulet et al.

(10) Patent No.: US 9,788,537 B1
(45) Date of Patent: Oct. 17, 2017

(54) SCENT REDUCTION DEVICE FOR A HUNTING BLIND

(71) Applicant: Llink Technologies, L.L.C, Brown City, MI (US)

(72) Inventors: Jeffrey Raymond Goulet, Dryden, MI (US); Christopher Mark Thom, Ray, MI (US); David Harold Dillon, Jr., Kingston, MI (US); Lisa Renee Spencer, Mussey, MI (US); Joseph Edward Gamache, EastPointe, MI (US)

(73) Assignee: LLINK TECHNOLOGIES, L.L.C., Brown City, MI (US)

( * ) Notice: Subject to any disclaimer, the term of this patent is extended or adjusted under 35 U.S.C. 154(b) by 0 days.

(21) Appl. No.: 15/137,374

(22) Filed: Apr. 25, 2016

(51) Int. Cl.
| | | |
|---|---|---|
| *A01M 31/02* | (2006.01) | |
| *E04H 15/00* | (2006.01) | |
| *E04H 15/54* | (2006.01) | |
| *E04H 15/58* | (2006.01) | |
| *E04H 15/64* | (2006.01) | |
| *E04H 15/14* | (2006.01) | |

(52) U.S. Cl.
CPC ......... *A01M 31/025* (2013.01); *E04H 15/001* (2013.01); *E04H 15/14* (2013.01); *E04H 15/54* (2013.01); *E04H 15/58* (2013.01); *E04H 15/64* (2013.01)

(58) Field of Classification Search
CPC ...... A01M 31/025; E04H 15/14; E04H 15/18; E04H 15/54; E04H 15/64; E04H 15/002; E04H 15/001

USPC .................................. 135/117, 901; 43/1
See application file for complete search history.

(56) References Cited

U.S. PATENT DOCUMENTS

| | | | | |
|---|---|---|---|---|
| 1,045,132 A | * | 11/1912 | Dorsey | E04H 15/32 135/117 |
| 3,690,334 A | * | 9/1972 | Miller | A01M 31/025 135/117 |
| 4,777,755 A | * | 10/1988 | Colburn | E04H 15/001 43/1 |
| 4,794,717 A | * | 1/1989 | Horsmann | A01M 31/025 135/901 |
| 5,628,338 A | * | 5/1997 | Stumbo | E04H 15/40 135/147 |
| 5,762,085 A | * | 6/1998 | Punch | E04H 15/001 135/115 |
| 5,813,160 A | * | 9/1998 | Thoelke | A01M 31/025 135/121 |
| 5,983,913 A | * | 11/1999 | Fargason | A01M 31/025 135/901 |
| 7,040,335 B1 | | 5/2006 | Ransom | |
| 7,493,910 B1 | | 2/2009 | Ransom | |
| 8,257,648 B2 | * | 9/2012 | Elrod | A61L 9/015 422/120 |
| 2002/0069904 A1 | * | 6/2002 | Robinson | B60J 11/00 135/87 |

(Continued)

Primary Examiner — Noah Chandler Hawk
(74) Attorney, Agent, or Firm — The Dobrusin Law Firm P.C.

(57) ABSTRACT

A device for sealing an opening in a structure. The device includes a covering placed over the opening, and an anchor located at an interface between the structure and the covering. The covering is readily penetrable by a bullet or an arrow. Air intake from an environment surrounding the structure is provided into the structure through the interface.

19 Claims, 3 Drawing Sheets

(56) References Cited

U.S. PATENT DOCUMENTS

2010/0200038 A1* 8/2010 Roman ................ E04H 15/001
　　　　　　　　　　　　　　　　　　　　135/144

* cited by examiner

SCENT REDUCTION DEVICE FOR A HUNTING BLIND

FIELD

These teachings relate to a device for reducing the transmission of scent from within a structure to the surrounding environment, while also providing for air intake into the structure from the surrounding environment.

BACKGROUND

Structures such as hunting blinds can be placed in or near the natural habitat of wild game for protecting a hunter from weather elements and/or for camouflaging the hunter from potential game.

Hunting blinds typically have one or more openings for ingress and egress and/or to provide a space for a weapon or projectile to be discharged through. However, the opening(s) may also provide for various scents from within the hunting blind to be transmitted to the surrounding environment, which may be detected by the potential game and thus put the game on alert and/or scare away the game.

Some structures include curtains to at least partially cover the one or more openings. However, such curtains are typically made from a porous material that allows for transmission of scents from within the structure into the surrounding environment, which may be detected by the potential game and thus put the game on alert and/or scare the game away. Some curtains are attached to the structure with various fasteners, such as zippers or hook and loop fasteners. During use, the curtain must be moved or removed from the opening before a weapon can be discharged through the opening, which may cause noise when opening the zipper or separating the hook and loop fastener, for example. The noises can be detected by potential game, which may put the game on alert and/or scare the game away before the weapon can be discharged.

Products such as scent-free soaps, toothpastes and gear including scent inhibiting clothing, boots, gloves and face masks can be used for reducing or inhibiting the transmission of scents into the surrounding environment, however, such products are known to be costly and burdensome to use.

Other products, such as those disclosed in U.S. Pat. Nos. 7,493,910 and 7,040,335 appear to propose a window cover for covering openings in a hunting blind, the teachings of which are incorporated by reference. However, U.S. Pat. Nos. 7,493,910 and 7,040,335 appear to teach a continuous and air-tight seal formed between the window cover and the wall of the hunting blind, which thus appears to prevent fresh air intake into the hunting blind. On warmer days, by limiting or preventing fresh air intake into the hunting blind, hunter perspiration within the hunting blind may result in condensation build up on the window cover, which may thereby decrease visibility through the window cover. In contrast, on colder days, by reducing or preventing fresh air intake into the hunting blind, when hunter body heat exceeds the interior temperature of the hunting blind, condensation may build up on the window cover thereby decreasing visibility through the window cover. Moreover, pollen, dirt molecules, stale air etc., can collect within an air-tight hunting blind. Having a reduced, limited, or non-existent fresh air intake into the hunting blind may also cause respiratory issues leading to sinus blockage, coughing, and/or sneezing, which may be detected by the potential game and thus put the game on alert and/or scare away the game.

There is therefore a need to overcome at least these shortcomings. For example, it may be desirable to have a device for a structure that reduces or eliminates the transmission scent out of the structure, while allowing fresh air intake into the structure. It may be desirable to have a device that can be quickly and easily attached to a hunting blind to cover an opening, quickly and easily detached or separated from the hunting blind to expose the opening, and then quickly and easily attached again to the hunting blind to cover the opening. It may be desirable to have a device that can be attached to a structure, be readily penetrable by a projectile such as a bullet or an arrow, and reduce or limit scent transmission out of the hunting blind, while also allowing fresh air intake into the hunting blind.

SUMMARY

These teachings provide a device for a structure such as a hunting blind that reduces or eliminates the transmission scent out of the hunting blind, while allowing a fresh air intake into the hunting blind. These teachings provide a cover that can be attached to a structure to cover an opening, can be separated from the structure to expose the opening, and then the same covering or a new covering can be reattached to the structure to cover the opening. These teachings provide a covering that can be attached to a structure to cover an opening, is readily penetrable by a projectile such as a bullet or an arrow, reduces or limits scent transmission out of the structure, while also allowing air intake into the structure from the surroundings.

These teachings provide device for covering or sealing an opening in a structure. The device includes a covering placed over the opening. An anchor located at an interface between the structure and the covering. The covering is readily penetrable by a bullet or an arrow. Air intake from the environment surrounding the structure is provided into the structure through the interface.

These teachings also provide a method of containing scent with one of the structures disclosed herein. The method includes steps of placing the covering over an opening in the structure, and attaching the covering to the structure.

These teachings further provide a hunting blind comprising a structure defined by at least one wall; an opening defined in at least one wall; a covering placed over the opening; and an anchor located at an interface between the at least one wall and the covering. The covering is readily penetrable by a projectile. The anchor provides for removeably attaching the covering to the at least one wall. The structure and the covering are substantially impervious to the transmission of scents from within the structure to an environment surrounding the structure. Air intake from the environment surrounding the structure is provided into the structure through the interface.

DETAILED DESCRIPTION

Figure 1:
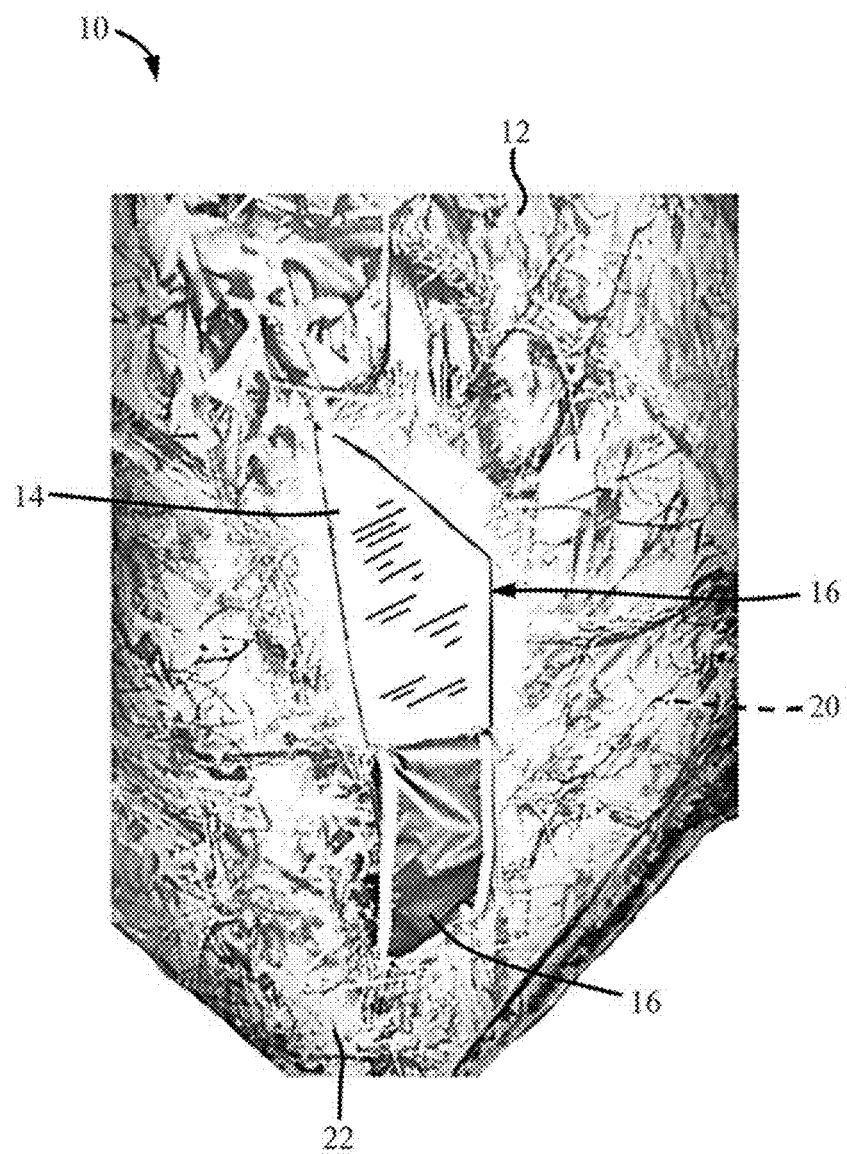
FIG. 1 is a front view of a portion of an outside surface of a wall or structure.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

These teachings relate to a structure. The structure may be any structure that is located on the ground, elevated on supports, or supported in a tree. The structure can be used anyone who desires to conceal scent within the structure, while also providing for air intake from the surroundings into the structure from the surroundings. For example, the structure can be used by a hunter or a wildlife photographer. The structure may be a hunting blind. For example, the hunting blind may be a tree blind, a tent blind, or any other type of blind.

The structure can have one or more walls. The one or more walls may function to define the structure. The one or more walls may function to provide shelter from weather elements such as wind, rain, snow, the like, or a combination thereof. The one or more walls may function to hide or camouflage an object and/or a person within the structure. The one or more walls may function to reduce or prevent scent transmission from within the structure to the environment surrounding the structure.

The one or more walls may be one or more side walls, one or more roof walls, one or more ground walls pads or, or a combination thereof. The one or more walls may be fabricated from a suitable material such as wood, plywood, plastic, fabric, cloth, nylon, canvas, Mylar, or a combination thereof. The one or more walls may be substantially impervious to the transmission of scent from within the structure to an environment surrounding the structure. The one or more walls may be readily penetrable by a weapon, such as a bullet or arrow. The arrow may be a fixed broad head or a mechanical broad head. The one or more walls may be optically transmissive. Optically transmissive as used throughout this disclosure may mean transparent, translucent, clear, crystal-clear, tinted, light permeable, light transmissive, wholly see-through, partially see-through, or a combination thereof. The one or more walls may be non-optically transmissive, which may be the opposite of optically transmissive. The one or more walls may include regions of both optically transmissive portions and non-optically transmissive portions. The one or more walls may have a color or pattern printed thereon in a manner to allow light and visibility through. For example, the one or more walls may have a camouflage pattern.

The structure, the one or more walls, or a combination thereof may include one or more openings. The one or more openings may function to provide ingress and egress. The one or more openings may function to provide visual access into and out of the structure. The one or more openings may function to provide light transmission into and/or out of the structure. The one or more openings may function to provide an area through which a weapon can be discharged from within the structure. The one or more openings may function to provide fresh air or air from the environment surrounding the structure into the structure. The one or more openings may function to provide for scent within the structure to be transmitted into the environment surrounding the structure. The one or more openings may be one or more windows, doors, vents, tears, apertures, orifices, slits, perforations, breaches, or a combination thereof.

The structure, the one or more walls, or a combination thereof may include one or more curtains. The curtain may function to at least partially cover or conceal an opening. The curtain may be attached to an outside surface or an outside surface of the structure or wall. The curtain may be attached to the structure or wall with a fastener, such as a zipper, strip magnet, hook and loop anchor, or a combination thereof. The curtain may be porous. When the curtain is applied over the opening, air may be brought into the structure from the surroundings, and scents from within the structure may be transmitted into the surroundings. The curtain may be optically transmissive, or non-optically transmissive. The curtain may or may not be readily penetrable by a projectile, such as a bullet, arrow, fixed or mechanical broad head, or a combination thereof. The curtain may be made of a suitable material, such as a canvas, nylon, cloth, material.

A covering may be attached to the wall or structure to cover an opening. The covering may function to cover, seal, block, close, overlay, close-off, or a combination thereof the one or more openings. The covering may function to reduce, restrict, prevent, or eliminate the transmission of scent from within the structure to an environment surrounding the structure. The covering may function to reduce, restrict, and/or limit the transmission of scent from within the structure to an environment surrounding the structure to a non-alarming level. The covering may be substantially impervious to the transmission of scent from within the structure to an environment surrounding the structure. The covering may function to restrict and/or conceal the presence of a user or movement of the user within the structure. The covering may function to provide shelter from weather elements such as wind, rain, snow, the like, or a combination thereof. The covering may function to provide for a projectile, such as a bullet, arrow, fixed or mechanical broad head, or a combination thereof, to be fired through the covering and penetrate the covering. The covering may be readily penetrable by a projectile, such as a bullet, arrow, fixed or mechanical broad head, or a combination thereof. The covering may function to provide for a projectile, such as a bullet, arrow, fixed or mechanical broad head, or a combination thereof to penetrate the covering without affecting substantially the trajectory of the projectile. The covering may function to provide a noise or sound baffle or barrier to reduce or dampen noise levels created within the structure to a non alarming level outside of the structure.

The covering may function to minimize or reduce interior condensation from forming on the walls and/or on the covering by allowing or providing for the transmission of air into the structure from the environment surrounding the structure. For example, on warmer days (e.g., approximately 70° F., or so), a user's perspiration inside the structure may result in condensation build up on an inner surface of the structure or covering, which may result in reduced visibility through the covering and/or an unpleasant environment for the user. For example on colder days (e.g., approximately 40° F., or so) heat from a user's body may result in condensation build up on an inside surface of the structure or covering, which may result in reduced visibility through the covering and/or an unpleasant environment for the user. The material of the covering may include anti-fog additives and/or an anti-fog formulation to restrict or prevent condensation build up. The covering may function as a vapor barrier to reduce fogging and condensation. The covering may function to allow water or other liquids to exit or be purged from the bottom of the covering.

The covering may be made of suitable material such as a polyester (PET), polyether, and/or polyethylene film or blend. The covering may be comprised of materials such as cellphone or Mylar. The covering may be free of materials such as cellphone or Mylar because those materials may be stiff, noisy, and/or may deform easily. The covering may be any color. The covering may have a pattern such as a camouflage pattern printed on it in a manner to allow light and visibility through the covering.

The covering may have a suitable thickness. The covering may have a suitable thickness to minimize the impact of penetration to the trajectory of the projectile. The covering may have a suitable thickness to minimize the impact on the trajectory and/or velocity of a projectile fired through the covering. The thickness of the covering may be on the order of approximately 0.1 mm more or less, 0.2 mm more or less, 0.3 mm more or less, 0.4 mm more or less, 0.5 mm more or less, 0.6 mm more or less, 0.7 mm more or less, 0.8 mm more or less, 0.9 mm more or less, or even 1.0 mm more or less. The thickness of the covering may be on the order of approximately 2 mm more or less, 1.75 mm more or less, 1.5 mm more or less, 1.25 mm more or less, 1 mm more or less, 0.8 mm more or less, 0.75 mm more or less, or even 0.50 mm more or less.

The covering may be optically transmissive. Optically transmissive as used throughout this disclosure may mean transparent, translucent, clear, crystal-clear, optically clear, tinted, light permeable, light transmissive, wholly see-through, partially see-through, or a combination thereof. The covering may be non-optically transmissive, which may be the opposite of optically transmissive. The covering may include regions of both optically transmissive portions and non-optically transmissive portions. The covering may have a color or pattern (such as camouflage) printed thereon in a manner to allow light and visibility through.

The covering may have one or more of the properties or characteristics disclosed herein. The covering may have anti-static characteristics, reduced or anti-fog characteristics, low gloss, UV light stabilized, minimal puncture/tear resistance, low density, low flammability, fire retardant additives, improved gloss and haze (e.g., measure of material clarity), or a combination thereof. The covering may be crystal-clear with low density, improved gloss, and improved haze. The covering may have a post-applied anti-fog spray or gel applied to it. The covering may have UV light reduction, which may further reduce the ability for potential game to detect a hunter's presence within the structure. The covering may have a clarity that meets ASTM D1746. The covering may have a film elongation at break of 100% MD to meet ASTM D882. The covering may have a tensile strength of approximately 32,000 MD to meet ASTM D882. The covering may have a haze of film percentage of approximately 2.7 to meet ASTM D1003. The covering may have a coefficient of friction of approximately. 50 dynamic to meet ASTM D1894. The covering may have a shrinkage of approximately 1.3 MD 0.1 TD; 30 min @ 300° F. The covering may have an application temperature range of approximately 32 to approximately 150° F. The covering may have a service range of 0 to 300° F. The covering may have a thickness or gauge of approximately 150 or less. The covering may have a low flammability.

The covering may be frameless. A frameless covering may function to allow for the covering to conform to various walls, profiles, geometries, or a combination thereof. A frameless covering may function to allow the covering to conform to an uneven wall or a protrusion or indentation in a wall or structure. Frameless may mean that the covering includes only the covering without any other structures except for an anchor attached thereto. Frameless may mean that the thickness of the covering, less any anchors attached thereto, is constant throughout. Frameless may mean that the covering includes only the material of the covering, except for the anchor.

The covering may be attached to the structure or to one or more walls of the structure. The covering may be attached to an inner wall or an inner surface of the one or more walls or structure. The covering may be attached to an outer wall or an outer surface of the one or more walls or structure. The covering may be attached to the structure or to the one or more walls removeably, permanently, or temporarily. The covering may be attached, detached, and reattached multiple times. The covering may be attached to the structure or wall, detached from the structure or wall, and reattached to the structure or wall, or a new covering can be attached to the structure or wall. The covering may be attached to the structure or to one or more walls of the structure with one or more anchors.

The one or more anchors may function to attach the covering to the structure or to one or more walls of structure. The one or more anchors may function to permanently attach the covering to the wall or structure. The one or more anchors may function to removeably, temporarily, or detachably attach the covering to the structure or to one or more walls of structure. For example, the one or more anchors may function to provide for attaching a covering to the structure or wall or the structure, detaching the covering from the structure or wall, and then re-attaching the same covering or a new covering to the structure or wall. When attaching a new covering or reattaching an existing covering to the structure or wall, the same anchors or new anchors may be used. For example, the anchors located on the wall or structure may remain, and the new covering or the existing covering may include new anchors, or vice versa. For example, old anchors may be removed from the wall and covering, and new anchors may be applied to the wall and the covering. For example, the same anchors may be used on the structure and covering multiple times when removing and attaching the covering. The one or more anchors may function to be impervious to transmission of scent from within the structure to an environment surrounding the structure. The one or more anchors may function to reduce, restrict, or prevent transmission of scent from within the structure to an environment surrounding the structure. The one or more anchors may function to provide for air intake into the structure from an environment surrounding the structure.

The one or more anchors may be located on an inner wall or surface of the structure or wall so that the one or more coverings can be attached to the inner wall or surface of the structure or wall. The one or more anchors may be located on an outer wall or surface of the structure or wall so that the one or more coverings can be attached to the outer wall or surface of the structure or wall. The one or more anchors may be located around a perimeter of the opening. The one or more anchors may be located around only a portion of the entire perimeter of the opening. In other words, the one or more anchors may be only intermittently arranged or disposed around a perimeter of the opening. For example, an anchor can be attached to a wall or structure every one inch or so around the perimeter of the opening; every two inches or so around the perimeter of the opening; every three inches or so around the perimeter of the opening; or even every four, five, or six inches around the perimeter of the opening. In some instances the anchors may be intermittently attached around a perimeter of the opening approximately six to twelve inches apart.

After the covering is attached to the wall or structure, gaps may be defined between the intermittently disposed anchors. The gaps may function to provide for the transmission of air from the surroundings into the structure. Therefore, it may be preferred to have one or more gaps or larger gaps between the anchors to facilitate a greater transmission of air from the surroundings into the structure. The gaps may also function to allow water to exit from within the structure. However, in some instances, the one or more anchors may be located continuously around an entire perimeter of the opening.

The one or more anchors may be a 2-part anchor. Accordingly, an anchor can be located on both a wall or surface of the structure and on a covering. For example, a 2-part anchor may comprise a first part and a second part. Accordingly, a first part of the anchor can be located on the structure or wall, and a second part of the anchor can be located on the covering, or vice versa. The anchor, the first part, the second part, or a combination thereof can be removeably or permanently attached to a corresponding wall, structure, or covering. For example, the anchor, the first part, the second part, or a combination thereof can be attached to the wall, structure, or covering with a suitable anchor such as by sewing, adhesives, fastening pins, or a combination thereof.

In some applications, the one or more anchors may be attached to a wall or structure as a retro-fit application. In other words, this may be ideal in situations where a structure was made or purchased with an opening that a user prefers to close off order to prevent transmission of scent into the surroundings. This may be preferred in situations where an opening was inadvertently created, for example, if the wall or structure was torn, and a user wishes to repair the opening to prevent transmission of scent into the surroundings. In such applications, a first part of the anchor can be attached around a perimeter of the opening, and then a covering can be applied over the opening and attached to the structure via mating anchors on the covering. Accordingly, transmission of scents from within the structure to the surroundings can be reduced to a non-alarming level. Air intake into the structure form the surroundings can be provided through gaps defined between the intermittently disposed anchors around a perimeter of the opening.

The anchor can be any suitable anchor. For example, the anchor can be a hook and loop fastener, where a first part of the anchor (e.g., the hook) is located or attached to one of the wall or surface of the structure and a second part of the anchor (e.g., the loop) is located on the covering, or vice versa. For example, the anchor can be a pair of opposing magnets, where a magnet with a first polarity is located or attached to one of the wall or surface of the structure and a magnet with a second opposing polarity is located or attached to the covering, or vice versa. For example, the anchor can be a zipper where a first part of the zipper is located or attached to one of the wall or surface of the structure and a second part of the zipper is located on the covering, or vice versa.

The anchor may be a hook and loop fastener. The hook and loop fastener may be made from Nylon #66. The anchor may have a hook on the order of a ⅞" diameter, or so. The anchor may have a hook made of 8.6 MIL monofilament. The anchor may have a hook made of approximately 280 hooks loops per square inch. The anchor may have a hook with a height of approximately 1.96 mm. The anchor may have a loop with a diameter on the order of approximately ⅞". The anchor may have a loop with a 600 loops per square inch. The anchor may have a loop with a height of approximately 1.93 mm. The anchor may have a loop with a life of new after approximately 5000 cycles. The anchor may have a loop with a sheer strength of approximately 14.15 PSI 13.5 PSI according to ASTM D5169-98 (2010). The anchor may have a loop with a peel strength of approximately 0.68 PIW 0.65 PIW according to ASTM D5170-98 (2010). The anchor may have a Peel Adhesion (PSTC-1) 100 oz/inch. The anchor may have a Shear Adhesion (Modified PSTC-7) Creep for 1"×1" bonded area with 1 lb. load, Creep at room temperature none, Temperature for ¹⁄₁₆" Creep 300 F. The anchor may have a Tensile Load (1"×1" area) 6.5-10 lbs. The anchor may have a useful service range 0 F to 158 F.

A tension of the covering may be adjusted. The tension of the covering may be adjusted in order to reduce, minimize, or eliminate bunching of the covering. The tension can be adjusted by moving or adjusting the spacing of the one or more of the anchors or parts of the anchor on the covering, the wall, the structure, or a combination thereof.

An interface may be defined as an area of over overlap between the covering and the structure and/or the wall. The interface may be substantially impermeable to the transmission of scent from within the structure to the surrounding environment. The interface may provide for the transmission of air from the environment surrounding the structure into the structure. The interface may be the area where the mating anchors are located.

The interface may include one or more gaps. The one or more gaps may function to provide for the transmission of air into the structure from the environment surrounding the structure. The one or more gaps may be located between one or more anchors intermittently disposed anchors. The one or more gaps may be located around a perimeter of the opening. The one or more gaps may be equally distributed around the perimeter of the opening. The one or more gaps may provide for water to exit the structure.

FIG. 1 illustrates a portion of a structure 10. The structure 10 includes at least one wall 12. An opening 14 is defined in the wall 14. A covering 16 is applied over the opening 14 by attaching the covering 16 to an inner surface 20 of the structure 10 or wall 12. A curtain 16 may be located on an outer surface 22 of the structure 10 or wall 12 for covering the opening 14 from the outside.

Figure 2:
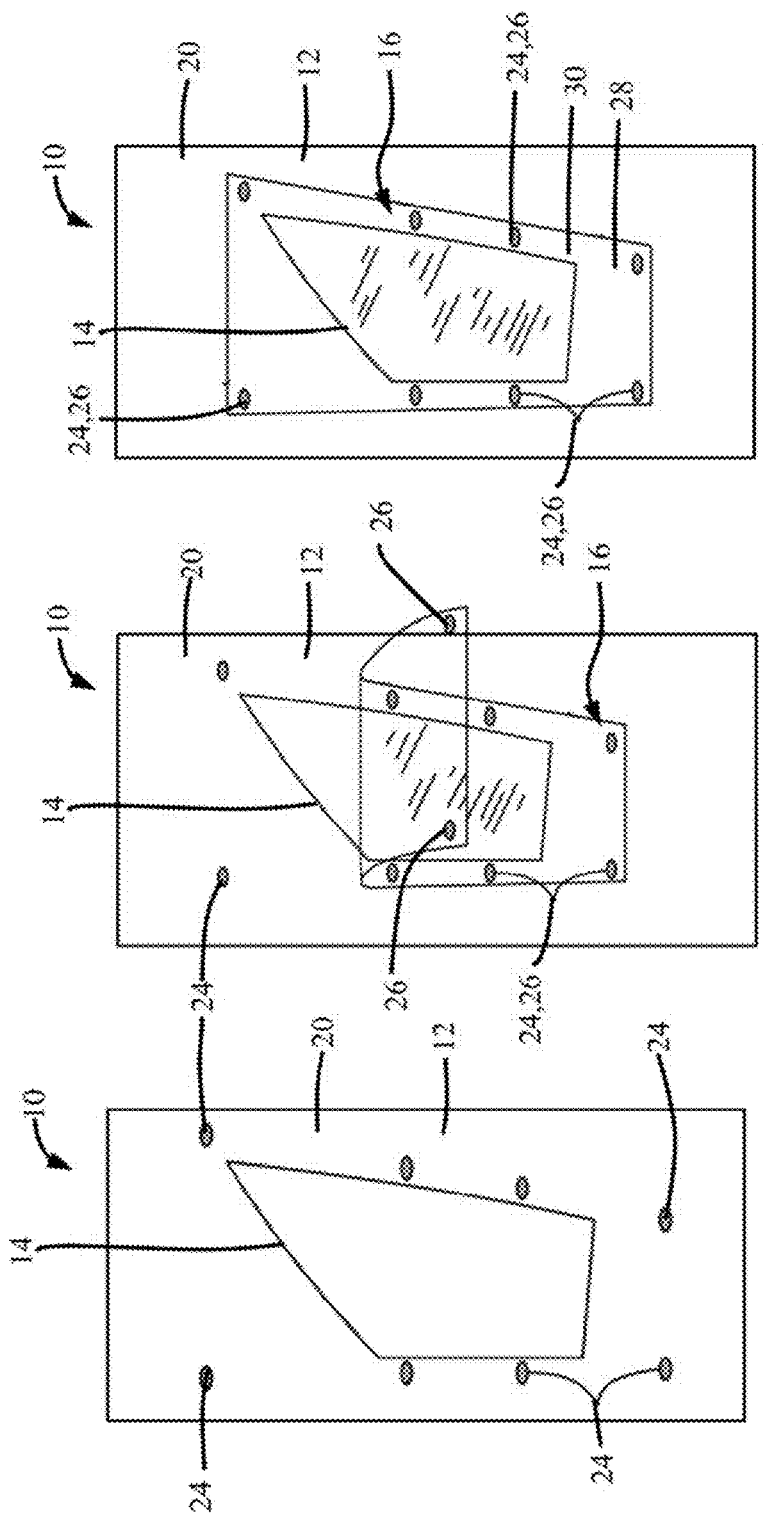
FIG. 2A is a front view of a portion of an inside surface of a wall or structure.
FIG. 2B is a front view of a portion of an inside surface of a wall or structure.
FIG. 2C is a front view of a portion of an inside surface of a wall or structure.

FIG. 2A illustrates a portion of the inner surface 20 of the structure 10 or wall 12. Intermittently disposed anchors 24 are located on the inner surface 20 around the opening 14.

FIG. 2B illustrates the covering 16 partially placed over the opening 14 and partially attached to the inner surface 20 of the structure 10 or wall 12. The covering 16 includes anchors 26 that mate with corresponding anchors 24 located on the inner surface 20 of the structure 10 or wall 12.

FIG. 2C illustrates the covering 16 placed over the opening 14 and attached to the inner surface 20 of the structure 10 or wall 12. The covering 16 includes anchors 26 that mate with the corresponding anchors 24 on the inner surface 20 of the structure 10 or wall 12 to attach the covering 16 to the structure 10 or wall 12. An interface 28 is defined where a portion of the covering 16 and the wall 12 overlap. A gap 30 is defined between the intermittently disposed and corresponding anchors 24, 26.

Figure 3:
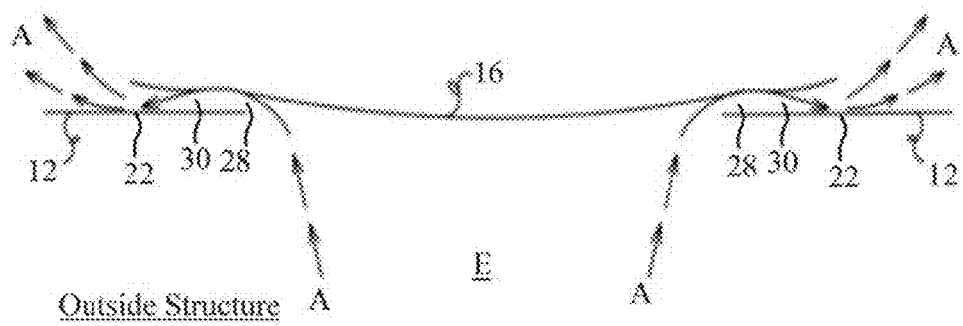
FIG. 3 is a cross-sectional view of a covering and a wall or structure.

FIG. 3 illustrates a cross section showing a portion of the wall 12 and the covering 16. The interface 28 is defined where the wall 12 and the covering 16 overlap. Gaps 30 are defined between the corresponding and intermittently disposed anchors 24, 26 (not shown). Air intake A is provided from the environment E surrounding the structure (e.g., on the outside surface 22 of the wall 12) into the structure 10 through the gaps 30.

Figure 4:
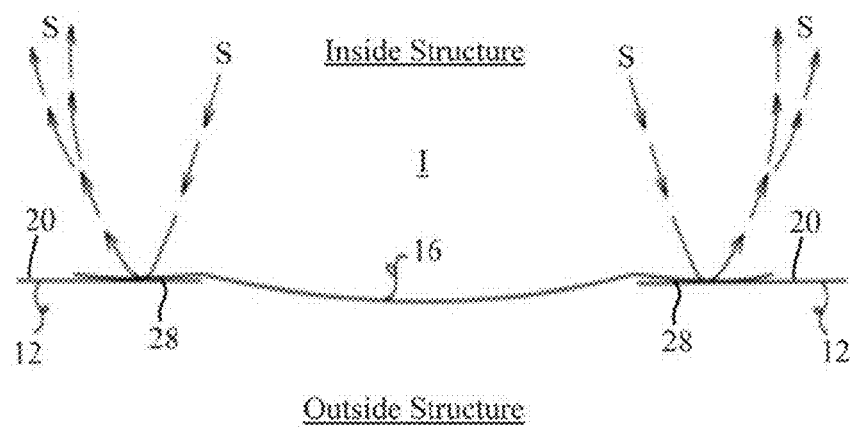
FIG. 4 is a cross-sectional view of a covering and a wall or structure.

FIG. 4 illustrates a cross section showing a portion of the wall 12 and the covering 16. The covering 16 and the interface 28 are impervious to the transmission of scent S from inside I the structure (e.g., on the inside surface 20 of the wall 12) to the environment E surrounding the structure.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A device for sealing an opening in a structure, the device comprising:
   an optically transparent covering placed over the opening; and
   a plurality of anchors located at an interface between the structure and the covering for removeably attaching the covering to the structure, the plurality of anchors are intermittently disposed around an entire perimeter of the opening,
   wherein a gap is defined between each of the plurality of anchors that are disposed around the entire perimeter of the opening,
   wherein the covering is readily penetrable by a bullet or an arrow,
   wherein air intake from an environment surrounding the structure is provided into the structure through one or more of the gaps at the interface, and
   wherein the structure and the covering are substantially impervious to transmission of scent from within the structure to the environment surrounding the structure.

2. The device of claim 1, wherein each of the anchors are a 2-part anchor,
   wherein a first part of the anchor is disposed on the structure, and a second part of the anchor is disposed on the covering, and
   wherein each of the anchors are a hook-and-loop fastener.

3. The device of claim 1, wherein the covering is attached to an inner surface of the structure, and
   wherein the covering is frameless.

4. The device of claim 1, wherein the covering comprises two or more of the following properties:
   i. a clarity that meets ASTM D1746;
   ii. reduced or anti-fog characteristics; and
   iii. a thickness of less than approximately 1 mm.

5. The device of claim 1, wherein the interface comprises an area of overlap between the covering and the structure around the entire perimeter of the opening.

6. The device of claim 5, wherein the interface is at an inner surface of the structure.

7. The device of claim 1, wherein a clarity of the covering meets ASTM D1746.

8. A method of containing scent within a structure, comprising steps of:
   placing an optically transparent covering over an opening defined in the structure; and
   attaching the covering to the structure with a plurality of anchors;

wherein the plurality of anchors are intermittently disposed around an entire perimeter of the opening such that gaps are formed between each of the anchors;

wherein air intake from an environment surrounding the structure is provided into the structure through the gaps; and wherein the structure and the covering are substantially impervious to transmission of scent from within the structure to the environment surrounding the structure.

9. The method of claim 8, wherein the attaching step comprises attaching the covering to an inner surface of the structure.

10. The method of claim 9, wherein each of the anchors comprise a first anchor and a complimentary second anchor, the second anchor is disposed on the covering, wherein the attaching step comprises attaching the first anchor to the inner surface of the structure, and wherein the first anchor and the second anchor are hook and loop fasteners.

11. The method of claim 8, wherein the method includes a step of firing a projectile through the covering from inside the structure.

12. The method of claim 8, wherein the method includes a step of removing the covering and attaching a new covering to the structure.

13. The method of claim 8, wherein the covering is frameless.

14. The method of claim 8, wherein the gaps are defined at an interface between the covering and an inner surface of the structure where the cover overlaps the structure around the entire perimeter of the opening.

15. A hunting blind comprising:

a structure defined by at least one wall;

an opening defined in the at least one wall;

an optically transparent covering placed over the opening, the covering is readily penetrable by a projectile, the covering is placed over the opening from an inside surface of the at least one wall; and a plurality of anchors located at an interface between the at least one wall and the covering, the plurality of anchors are disposed around an entire perimeter of the opening the plurality of anchors providing for removeably attaching the covering to the at least one wall, wherein the interface comprises an area of overlap between the covering and the inside surface of the at least one wall around the entire perimeter of the opening, wherein the structure and the covering are substantially impervious to the transmission of scent from within the structure to an environment surrounding the structure, and wherein air intake from the environment is provided into the structure through gaps defined between the plurality of anchors at the interface between the at least one wall and the covering.

16. The hunting blind of claim 15, wherein each of the anchors are a 2-part anchor, wherein a first part of the anchor is located on the at least one wall and a second part of the anchor is located on the covering, and wherein the anchor is a hook-and-loop anchor.

17. The hunting blind of claim 15, wherein the covering is optically transmissive and includes properties of:

i. a clarity that meets ASTM D1746;

ii. reduced or anti-fog characteristics; and iii. a thickness of less than approximately 1 mm.

18. The hunting blind of claim 15, wherein the projectile is an arrow or a bullet.

19. The hunting blind of claim 15, wherein the covering comprises UV light reduction to reduce detection of a hunter's presence inside the structure.

* * * * *